United States Patent Office 2,936,260
Patented May 10, 1960

2,936,260

HEAT-RESISTANT RESINS AND LAMINATES

George Alexander, Pittsfield, Mass., assignor to General Electric Company, a corporation of New York No Drawing. Application July 2, 1956
Serial No. 595,081

9 Claims. (Cl. 154—128)

This application is a continuation-in-part of my co-pending and now abandoned application Serial No. 359,-967, filed June 5, 1953, and assigned to the same assignee as the present invention.

This invention relates to heat-resistant resins produced from specific phenol-aldehyde condensates and unsaturated ethers of polymethylol phenol and which are eminently suited for the manufacture of laminated products. The invention includes both thermosetting compositions and laminates made therefrom.

The novel compositions of the present invention comprise (1) a thermosetting, partially reacted, aqueous phenolic resin prepared by reacting a phenol with an excess of an aldehyde in the presence of a catalyst selected from the group consisting of calcium hydroxide and barium hydroxide, neutralizing with carbon dioxide to form a carbonate with the cation of the catalyst and removing the carbonate, and (2) from about 20 to 80 percent, by weight of the composition, of (a) a methylol phenyl ether corresponding to the general formula

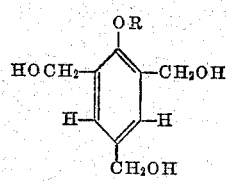

where R represents a member of the class consisting of ethylenically unsaturated aliphatic radicals containing at least three carbon atoms and halogenated derivatives of the aforesaid unsaturated aliphatic radicals or (b) the methylol phenyl ether of (a) above in admixture with methylol phenyl ethers corresponding to the general formula

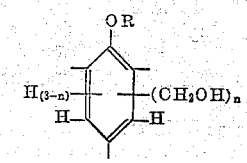

where $n$ is an integer of the group consisting of 1 and 2 and R has the meaning given above.

Among the organic groups which R in the above formula may represent are, for instance, unsaturated aliphatic radicals, e.g., allyl, methallyl, crotyl, butenyl, etc., as well as mono- and polyhalogenated derivatives of the aforesaid unsaturated aliphatic groups, e.g., 2-chloroallyl, 3-chloroallyl, 3-chloro-2-methylallyl, 1-chloro-2-butenyl, etc., groups. The halogen may also be bromine, fluorine, etc.

The methylol phenyl ethers may be prepared by a variety of methods. Thus, they may be prepared from compounds corresponding to the general formula

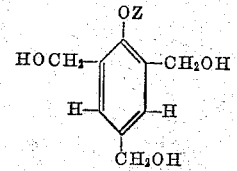

where Z is either a sodium or a barium atom. Such methylol phenyl ethers are more particularly disclosed in Martin Patent 2,579,330 assigned to the assignee of the present invention. Thus, these ethers may be prepared by effecting reaction between either the sodium salt or barium salt of trimethylol phenol with the particular organic halide desired in order to replace the sodium or barium cation with the organic residue of the organic halide.

In order that those skilled in the art may better understand how the present invention may be practiced, the following examples are given by way of illustration and not by way of limitation. The following examples illustrate the preparation of various ethers coming within the scope of the above-identified general formula. All parts are by weight.

*Example I*

To 210 parts by weight of sodium 2,4,6-tris (hydroxymethyl) phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulfate. The amyl alcohol was removed under vacuum. The product, 1-allyloxy-2,4,6-tris (hydroxymethyl) benzene, was a brown syrup.

*Example II*

42 parts by weight of the sodium 2,4,6-tris (hydroxymethyl) phenate were mixed with 40 parts by volume of 2.5 percent solution of sodium hydroxide. 19 parts by weight of 2-methallyl chloride were added. The reaction ingredients were shaken at 55° C. for 48 hours. The cooled reaction product was added to 200–300 parts by weight of hot water, heated for a short period and stirred. An oily layer was recovered, washed and dissolved in acetone, filtered, and the water and acetone distilled off. The product, 1-(2'-methallyloxy)-2,4,6-tris (hydroxymethyl) benzene, was a very viscous, almost solid brown syrup.

*Example III*

Example II was repeated using 23.3 parts by weight of 2,3-dichloropropene in lieu of the 2-methallyl chloride. Methanol was not used. The product, 1-(2'-chloroallyloxy)-2,4,6-tris (hydroxymethyl) benzene was a viscous brown syrup.

*Example IV*

1-(3'-chloroallyloxy)-2,4,6-tris (hydroxymethyl) benzene, a viscous brown syrup, was prepared by repeating Example II using 1,3-dichloropropene in lieu of the 2-methallylchloride and without the use of methanol.

*Example V*

Three hundred and fifty parts phenol and 900 parts 37.3% aqueous formaldehyde were mixed with stirring. To the solution were added 164 parts sodium hydroxide in 170 parts water and the whole reacted for six and onehalf hours at 40° C. Three hundred and three parts by weight of allyl chloride were then added and the mixture reacted in a pressure reactor at 60° C. for three hours with vigorous stirring. The aqueous layer was drawn off and the organic layer dehydrated by heating under a vacuum.

It will, of course, be apparent to those skilled in the art that by varying the conditions of reaction, for example, by employing a different temperature or a shorter or longer reaction period and also by altering the molar ratios of the reactants, yields containing varying percentages of the allyl (hydroxymethyl) phenyl ethers may be obtained. Thus, by a proper choice of conditions, it is posible to prepare reaction products comprising from 5 to 60 percent, by weight of allyloxy tris (hydroxymethyl) benzene, and 0 to 40 percent, by weight of each of the allyl uni- and bis (hydroxymethyl) benzenes.

The methylol phenyl ethers described above are used in conjunction with certain specific liquid phenolaldehyde resins in preparing the novel laminating resins and varnishes of my invention. Among the liquid resins coming within the scope of the instant invention are the liquid products of partial reaction of ingredients comprising "a phenol," within the meaning of which term is included, for instance, phenol ($C_6H_5OH$) itself, m-cresol, 3,5-xylenol, resorcinol, etc., as well as mixtures of "phenols," and a molar excess of an aldehyde, e.g., formaldehyde, acetaldehyde, furfural, etc., as well as mixtures of aldehydes. The preferred reactants are phenol and formaldehyde.

The phenolic resins are prepared in the presence of either barium or calcium hydroxide catalysts, barium hydroxide being preferred. Upon reaching a predetermined viscosity, that of the A stage resin, the catalyst is neutralized by introducing into the reaction product carbon dioxide, preferably in excess. The carbon dioxide may be introduced in the form of either a gas or a solid (Dry Ice). The carbon dioxide forms an insoluble carbonate with the calcium or barium ions and may be easily removed in conventional fashion, as by filtration or centrifuging. The neutralized and filtered resin solution is then preferably subjected to heat and vacuum to remove some of the water or other solvent and to remove the excess carbon dioxide. The product is a resin almost totally free of soluble ions and having a pH in the range of 5 to 7, preferably about 6.5.

The following examples illustrate the preparation of phenolic resins useful in this invention. All parts are by weight.

Example VI

To 51 parts of 37.2% formaldehyde 0.76 part of barium hydroxide was added and after the barium hydroxide was in solution, 45.9 parts of phenol were aded. The mixture was then heated, allowed to boil and refluxed for about an hour and a quarter. 26 parts of carbon dioxide were then added until the pH was about 6.5. The resulting resin was then filtered to remove the $BaCO_3$ suspension. The filtered resin was then subjected to vacuum and heated until approximately 10 parts of condensate had been distilled off. The resulting resin had a specific gravity of 1.16–1.2 at 25° C. and a viscosity of 200–300 cp. at 25° C. The resin solids was approximately 68 to 72%.

Example VII

A resin was prepared as in Example V except that the resin was subjected to heat and pressure to remove about 16.50 parts of condensate. The resulting resin had a specific gravity of 1.22–1.24 at 25° C., a viscosity of about 18,000–25,000 cp. at 25° C. and a resin solids content of 78–87%.

The amount of methylol phenyl ether which may be used with the foregoing phenolic resins may be varied within wide limits without departing from the scope of the invention. On a weight basis, the amount of methylol phenyl ethers employed may vary, for instance, from about 20 to 80 percent of the total weight of the combined methylol phenyl ethers and the aforementioned phenolic resins. Generally, I prefer to use from 40 to 60 percent by weight, of the ethers, based on the combined weight of the latter and the resin. If desired, and where necessary, the methylol phenyl ethers and the resin may be dissolved in a suitable solvent in order to blend the material together prior to further processing.

The following examples illustrate the improvements in heat resistance obtained by adding the unsaturated methylol phenyl ethers to the above described phenolic resins and forming laminates with the resulting composition.

Example VIII

Mixed ethers comprising the reaction product of Example V were mixed in equal parts with the phenolic resin prepared as in Example VI and a laminate (Lam. 1 in table below) prepared using glass cloth. Another laminate (Lam. 2 in table below) was prepared using the phenolic resin of Example VI alone. Each of the laminates 1 and 2 had a resin content of from 37–40%, were laminated at a temperature of 160–165° C. and a low pressure of approximately 25–30 p.s.i. They were then post-cured for 24 hours at 125–130° C. and tested for their heat resistance by placing them in an oven at 250° C. and observing the loss in flexural strength. The results were as follows:

| | Lam. 1 | Lam. 2 |
|---|---|---|
| Flexural strength, original (p.s.i.) | 47,400 | 51,400 |
| Flexural strength after 3 days at 250° C | 26,930 | 26,630 |
| Percent drop in strength | 43.2 | 48.2 |
| Flexural strength after 7 days at 250° C | 17,860 | 13,750 |
| Percent drop in strength | 62.3 | 73.1 |
| Flexural strength after 10 days at 250° C | 13,640 | 11,870 |
| Percent drop in strength | 71.2 | 76.8 |

The above results illustrate the unexpected improvement in heat resistance obtained by using the compositions of this invention. The drop in flexural strength was less for the laminates of this invention (Lam. 1) at the end of each of the periods above recorded. At the end of 10 days, the laminate of this invention retained a higher percentage of its original strength than the laminate prepared with the phenolic resin alone. It should be noted that the above tests were repeated over a dozen times and the results were found to be consistent and reproducible.

Example IX

The following example compares the heat resistance of laminates molded under higher pressures. Each of the following glass cloth laminates (Lam. 3, Lam. 4 in table below), had a resin content of 38%, were laminated at a temperature of 160–165° C. and a pressure of 1000 p.s.i. The resin used in preparing laminate 3 was the same as that used in laminate 1 above, i.e., the methylol phenyl ethers of Example V were mixed with the phenolic resin of Example VI. The resin of laminate 4 was the same as that used in laminate 2, i.e., the phenolic resin of Example VI alone.

The results were as follows:

| | Lam. 3 | Lam. 4 |
|---|---|---|
| Flexural strength, original (p.s.i.) | 56,750 | 49,330 |
| Flexural strength after 3 days at 250° C | 39,770 | 22,985 |
| Percent drop in strength | 29.7 | 53.3 |
| Flexural strength after 7 days at 250° C | 27,020 | 13,185 |
| Percent drop in strength | 52.3 | 73.2 |

The above experiment further indicates the marked improvement in heat resistance achieved by the resinous compositions of this invention. In addition to retaining a higher percentage of its flexural strength under prolonged exposure to heat, laminate 3 has a final flexural strength more than twice that of laminate 4, after seven days' exposure.

Example X

A further test was conducted in order to ascertain whether phenolic laminating resins other than those above described as useful in the practice of this invention would achieve improved heat resistance when modified with methylol phenyl ethers. A phenolic resin was prepared by reacting an excess of formaldehyde with phenol in the presence of ammonium hydroxide as catalyst. The resulting resin had a specific gravity of about 1.055–1.060, a viscosity at 25° C. of about 100–250 cps. and resin solids content of 56–58%. This resin was then mixed with the methylol phenyl ether of Example V and a laminate prepared. After less than two hours of exposure at a temperature of 250° C., the laminate blistered so that strength tests could not be made. This test indicates the importance of using phenolic resins prepared in the manner above set out. While the reason for the necessity of the specific phenolic resins indicated is not fully known, it is believed that resins prepared by the method of the present invention are particularly stable because of the absence of catalyst or neutralization ions and because of the substantial absence of acidity or alkalinity.

While the foregoing examples illustrate the unexpectedly enhanced heat resistance of laminates prepared in accordance with this invention, it should also be noted that the chemical resistance of laminates is also improved if the compositions of this invention are employed. Thus, laminates made with a mixture of methylol phenyl ethers and the phenolic resins of this invention have been found to have improved resistance to caustic, to ammonia, to sulfuric, hydrochloric and nitric acids and to hydrogen peroxide.

While the mixed allyl ethers have been found to be very useful in forming the novel compositions and laminates of my invention, other hereinbefore-described unsaturated ethers can also be advantageously employed. The principal reason for using the described mixture is due to the expense involved in separating and producing each of the ethers in the pure state. However, as above set out, the single methylol phenyl ethers may also be employed.

In addition to the resins previously described, illustrative examples of other liquid, thermosetting phenolic resins which may be employed in the process of invention include the liquid, barium or magnesium hydroxide catalyzed products of partial reaction of:

Phenol and furfural
m-Cresol and formaldehyde
m-Cresol and furfural
3,5-xylenol and formaldehyde
3,5-xylenol and furfural
Phenol, formaldehyde and furfural
Phenol, resorcinol and formaldehyde
Phenol, resorcinol and furfural
Phenol, formaldehyde and acetone
Phenol, formaldehyde and acetaldehyde
Phenol, phenyl phenol and formaldehyde
Phenol, alpha-phenylethyl phenol and formaldehyde
Phenol, m-cresol, formaldehyde and furfural
"82% phenol" and furfural
"82% phenol," formaldehyde and furfural.

As above described, the phenolic resins are prepared by reacting, in the presence of the barium or calcium hydroxide, an excess of the aldehyde with a phenol, the molar ratio of aldehyde to phenol being ordinarily about 1.1 to 2.0 mols of aldehyde to 1.0 mol phenol. The resin is then neutralized with $CO_2$ and its resin solids content suitably adjusted.

While the preferred laminates are those made from glass cloth, other conventional laminating materials may be used, including micaceous sheet material, polyester film, asbestos, glass thread reinforced rope paper and other well-known sheet material made from inorganic fillers.

The initial thermosetting compositions and laminates of the instant invention have a wide field of utility. The initial compositions can be applied as a coating to various materials where it is sought to impart its exceptionally good heat and chemical-resistant properties. They can be used either with or without a solvent to coat various surfaces by brushing, dipping or spraying. The cast compositions find a wide variety of uses. For instance, they can be used as potting compositions for electrical coils and for casting numerous other articles such as cutlery handles, tool handles, etc. Laminates of the instant invention, as is evident from the foregoing description, have great utility in high temperature applications, for instance, for various constructional, decorative and insulation purposes. One use of the laminates is as a substitute for aluminum in the construction of military aircraft where the ability to retain mechanical strength at elevated temperatures during high speed flight is a basic requirement.

What I claim as new and desire to secure by Letters Patent of the United States is:

1. A resinous composition comprising (1) a thermosetting, partially reacted, liquid phenolic resin prepared by reacting a phenol selected from the class consisting of phenol, alkyl and aryl substituted monohydroxy phenols, unsubstituted dihydroxy phenols and mixtures thereof with an excess of an aldehyde selected from the group consisting of saturated aldehydes and mixtures thereof in the presence of a catalyst selected from the group consisting of calcium and barium hydroxide, neutralizing with carbon dioxide to form a carbonate with the cation of the catalyst and removing the carbonate, and (2) from about 20 to 80 percent by weight of the composition, of a methylol phenyl ether corresponding to the general formula

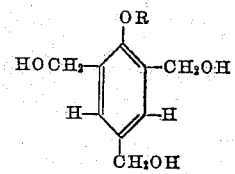

where R represents a member of the class consisting of ethylenically unsaturated aliphatic radicals containing from three to about four carbon atoms, and halogenated derivatives of the aforesaid unsaturated aliphatic radicals.

2. A resinous composition comprising (1) a thermosetting, partially reacted, liquid phenolic resin prepared by reacting a phenol selected from the class consisting of phenol, alkyl and aryl substituted monohydroxy phenols, unsubstituted dihydroxy phenols and mixtures thereof with an excess of an aldehyde selected from the group consisting of saturated aldehydes and mixtures thereof in the presence of a catalyst selected from the group consisting of calcium and barium hydroxide, neutralizing with carbon dioxide to form a carbonate with the cation of the catalyst and removing the carbonate, and (2) from about 20 to 80 percent by weight of the composition, of a mixture of ingredients comprising (a) a methylol phenyl ether corresponding to the general formula

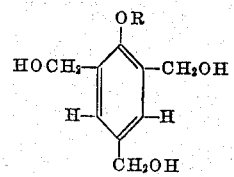

where R represents a member of the class consisting of ethylenically unsaturated aliphatic radicals containing from three to about four carbon atoms, and halogenated derivatives of the aforesaid unsaturated aliphatic radicals, and (b) methylol phenyl ethers corresponding to the general formula

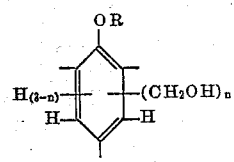

where $n$ is an integer of the group consisting of 1 and 2, and R has the meaning given above.

3. The resinous composition of claim 1 in which the phenolic resin is prepared by reacting phenol with formaldehyde in the presence of barium hydroxide as the catalyst.

4. The resinous composition of claim 2 in which the phenolic resin is prepared by reacting phenol with formaldehyde in the presence of barium hydroxide as the catalyst.

5. The resinous composition of claim 3 in which the methylol phenyl ether comprises 1-allyloxy-2,4,6-tris(hydroxymethyl) benzene.

6. A laminated sheet material comprising a plurality of superimposed sheets adhesively secured together and coated with a composition comprising (1) a thermosetting, partially reacted, liquid phenolic resin prepared by reacting a phenol selected from the class consisting of phenol, alkyl and aryl substituted monohydroxy phenols, unsubstituted dihydroxy phenols and mixtures thereof with an excess of an aldehyde selected from the group consisting of saturated aldehydes and mixtures thereof in the presence of a catalyst selected from the group consisting of calcium and barium hydroxide, neutralizing with carbon dioxide to form a carbonate with the cation of the catalyst and removing the carbonate, and (2) from about 20 to 80 percent by weight of the composition, of a methylol phenyl ether corresponding to the general formula

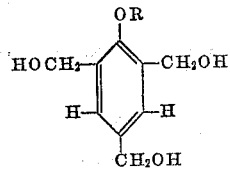

where R represents a member of the class consisting of ethylenically unsaturated aliphatic radicals containing from three to about four carbon atoms, and halogenated derivatives of the aforesaid unsaturated aliphatic radicals.

7. A laminated sheet material comprising a plurality of superimposed sheets adhesively secured together and coated with a composition comprising (1) a thermosetting, partially reacted, liquid phenolic resin prepared by reacting a phenol selected from the class consisting of phenol, alkyl and aryl substituted monohydroxy phenols, unsubstituted dihydroxy phenols and mixtures thereof with an excess of an aldehyde selected from the group consisting of saturated aldehydes and mixtures thereof in the presence of a catalyst selected from the group consisting of calcium and barium hydroxide, neutralizing with carbon dioxide to form a carbonate with the cation of the catalyst and removing the carbonate, and (2) from about 20 to 80 percent by weight of the composition, of a mixture of ingredients comprising (a) a methylol phenyl ether corresponding to the general formula

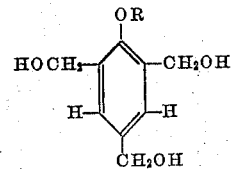

where R represents a member of the class consisting of ethylenically unsaturated aliphatic radicals containing from three to about four carbon atoms, and halogenated derivatives of the aforesaid unsaturated aliphatic radicals, and (b) methylol phenyl ethers corresponding to the general formula

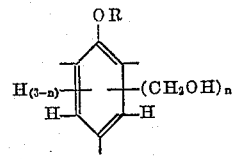

where $n$ is an integer of the group consisting of 1 and 2, and R has the meaning given above.

8. The laminated sheet material of claim 6 in which the phenolic resin is prepared by reacting phenol with formaldehyde in the presence of barium hydroxide as the catalyst.

9. The laminated sheet material of claim 6 in which the sheets are glass cloth.

References Cited in the file of this patent

UNITED STATES PATENTS

| | | |
|---|---|---|
| 2,561,449 | Ruderman | July 24, 1951 |
| 2,579,331 | Martin | Dec. 18, 1951 |
| 2,606,935 | Martin | Aug. 12, 1952 |
| 2,659,710 | Martin | Nov. 17, 1953 |

OTHER REFERENCES

Chase: Article in Official Digest, March 1952, page 172.
Chem. Eng. New, volume 30 (1952), page 4986.
D'Alelio: "Experimental Plastics and Synthetic Resins," page 158, John Wiley & Sons, New York, 1946.